(12) United States Patent
Katsuma et al.

(10) Patent No.: US 7,911,694 B1
(45) Date of Patent: Mar. 22, 2011

(54) SCREEN

(75) Inventors: Ryoji Katsuma, Matsumoto (JP); Akira Shinbo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/876,627

(22) Filed: Sep. 7, 2010

(30) Foreign Application Priority Data

Sep. 24, 2009 (JP) .................................. 2009-218619

(51) Int. Cl.
*G03B 21/60* (2006.01)
(52) U.S. Cl. ........................................................ 359/459
(58) Field of Classification Search .................. 359/449, 359/459, 619, 629
See application file for complete search history.

(56) References Cited

U.S. PATENT DOCUMENTS

2010/0259818 A1* 10/2010 Mikoshiba .................... 359/459

FOREIGN PATENT DOCUMENTS

JP 2009-015195 A 1/2009

* cited by examiner

*Primary Examiner* — Christopher Mahoney
(74) *Attorney, Agent, or Firm* — AdvantEdge Law Group, LLC (57) ABSTRACT

A screen includes: a screen substrate; a first area disposed on the screen substrate and containing a first main line which has a plurality of first concaves for reflecting light and a first supplementary line which is disposed on the screen substrate at a position adjacent to the first main line and has the same number of second concaves as that of the first concaves formed adjacent to the second concaves, the first main line and the first supplementary line being alternately and repeatedly arranged; and a second area disposed on the screen substrate in a region where an angle of incidence of projection light with respect to the screen substrate becomes larger than in the first area and containing a second main line which has a plurality of third concaves for reflecting light and a second supplementary line which is disposed on the screen substrate at a position adjacent to the second main line and has a larger number of fourth concaves as that of the third concaves formed adjacent to the fourth concaves, the second main line and the second supplementary line being alternately and repeatedly arranged.

8 Claims, 12 Drawing Sheets

SCREEN

BACKGROUND

1. Technical Field

The present invention relates to a screen which reflects projection light obliquely supplied from a projection device such as a projector for display of a projection image.

2. Related Art

An example of a known projection image reflecting screen which reflects light obliquely supplied from below to display an image such that the image can be viewed on the front surface side of the screen has a number of concaves or convexes on a screen substrate (for example, see JP-A-2009-15195). This screen has a reflection surface for reflecting projection light on a surface of each concave or convex in correspondence with the position of the projection supplied from a projection device such as a projector. In addition, the directions of the concaves or convexes provided on the screen substrate and disposed adjacent to one another in the vertical direction deviate from the horizontal direction of the screen substrate, which allows reflection of a large quantity of light obliquely supplied from below.

According to the screen disclosed in JP-A-2009-15195, however, a part of the projection light is blocked by projections formed by the adjoining concaves when the angle formed by the projection light from the projector and the screen normal line (angle of incidence) becomes a certain angle or larger. In this case, there is a possibility that loss of view in the image such as local light reduction is produced.

SUMMARY

It is an advantage of some aspects of the invention to provide a screen capable of reducing the possibility of blocking projection light and capable of decreasing loss of view.

A screen according to an aspect of the invention includes: a screen substrate; a first area disposed on the screen substrate and containing a first main line which has a plurality of first concaves for reflecting light and a first supplementary line which is disposed on the screen substrate at a position adjacent to the first main line and has the same number of second concaves as that of the first concaves formed adjacent to the second concaves, the first main line and the first supplementary line being alternately and repeatedly arranged; and a second area disposed on the screen substrate in a region where an angle of incidence of projection light with respect to the screen substrate becomes larger than in the first area and containing a second main line which has a plurality of third concaves for reflecting light and a second supplementary line which is disposed on the screen substrate at a position adjacent to the second main line and has a larger number of fourth concaves as that of the third concaves formed adjacent to the fourth concaves, the second main line and the second supplementary line being alternately and repeatedly arranged.

According to this screen, the first and second supplementary lines are provided as well as the first and second main lines. Thus, even when the angle of incidence of the projection light is large, a sufficient amount of the projection light can be supplied to the surfaces of the first and third concaves for reflection. Moreover, since the number of the fourth concaves on the second supplementary line is larger than the number of the third concaves on the second main line in the second area where the angle of incidence becomes relatively large, each height of projections formed by the third concave and the fourth concave adjacent to the third concave or the fourth concave and by a pair of the fourth concaves adjacent to each other becomes smaller than each height of the corresponding projections in the structure including the same number of the fourth concaves as that of the third concaves similarly to the first area. Thus, even when the angle of incidence of the projection light is larger in the second area than in the first area, the projection light is prevented from being blocked by the projections. Accordingly, loss of view can be reduced.

In a specific aspect of the invention, a reflection portion is formed at least on a part of each surface of the first concaves and the third concaves to reflect the projection light by the reflection portion to the front surface side. The portion other than the part having the reflection portion on each surface of the first concaves and the third concaves and each surface of the second concaves and the fourth concaves absorb or transmit the projection light. The portion other than the part having the reflection portion on each of the first concaves and the third concaves which reflects the projection light to the front surface side and each of the second concaves and the fourth concaves, i.e., the portions not intending to receive the projection light absorb the outside light or the like, for example, to improve the contrast of an image reflected by the screen.

In another aspect of the invention, at least a part of each of the first main line, the first supplementary line, the second main line, and the second supplementary line has a circular-arc shape. Since the first main line, the first supplementary line, the second main line, and the second supplementary line are circular-arc-shaped, the arrangements and shapes of the concaves contained in these lines can be matched with the entrance positions of the projection light. Thus, the projection light can be reflected in an adequate condition. It is preferable that the respective lines are alternately disposed on the screen substrate with no clearance left between one another.

In still another aspect of the invention, in the second area close to the boundary between the second area and the first area, the distance between at least a pair of the fourth concaves adjacent to the same third concave increases as the angle of incidence of the projection light with respect to the screen substrate becomes larger. Since the distance between the fourth concaves adjacent to each other in the second area close to the boundary between the second area and the first area gradually increases as the positions of the fourth concaves shift away from the first area, unevenness in switching in the boundary between the first area and the second area is not produced. It is assumed herein that the single third concave and at least a pair of the fourth concaves disposed for the corresponding third concave on the entrance side of the projection light are considered as a unit. The unevenness in switching herein refers to light unevenness observed as stepped or moiré pattern due to non-uniform change of apparent reflectance caused by different arrangements of the concaves in the two areas.

In yet another aspect of the invention, the number of the fourth concaves contained in the second supplementary line in the second area close to the boundary between the second area and the first area increases as the angle of incidence of the projection light with respect to the screen substrate becomes larger. Since the number of the fourth concaves in the second area close to the boundary between the second area and the first area gradually increases as the positions of the fourth concaves shift away from the first area, unevenness in switching in the boundary between the first area and the second area is not produced.

In still yet another aspect of the invention, the clearance between the first main line and the first supplementary line and the clearance between the second main line and the second supplementary line increase as the angle of incidence of the projection light with respect to the screen substrate becomes larger. In this case, the visibility angle can be secured even when the angle of incidence of the projection light with respect to the screen substrate is large.

In further another aspect of the invention, the screen further includes a third area disposed on the screen substrate in a region where the angle of incidence of the projection light with respect to the screen substrate becomes smaller than in the first area and containing a third main line which has a plurality of fifth concaves and reflects light by at least a part of each of the fifth concaves. In this case, the projection light can be efficiently reflected in the region where the angle of incidence of the projection light is small.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A screen according to a first embodiment of the invention is hereinafter described with reference to the drawings. In the respective figures, a Z axis corresponds to the normal line direction of a screen 1, a Y axis corresponds to the vertical direction crossing the Z axis at right angles and extending in parallel with the screen 1, and an X axis corresponds to the horizontal direction crossing the Z axis at right angles and extending in parallel with the screen 1.

Figure 1A:
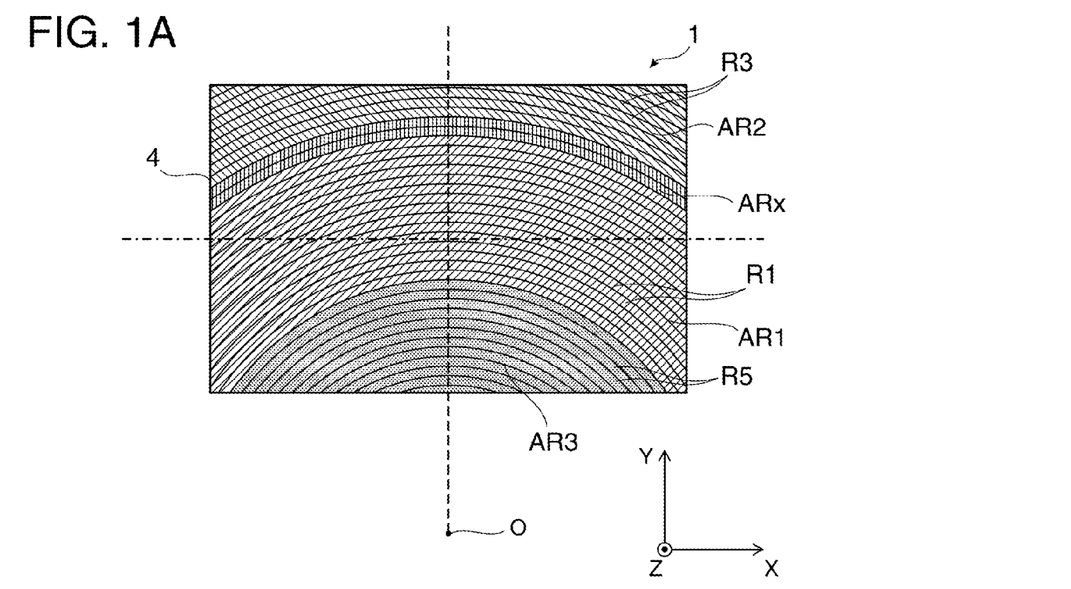
FIG. 1A is a front view of a screen according to a first embodiment.
Figure 1B:
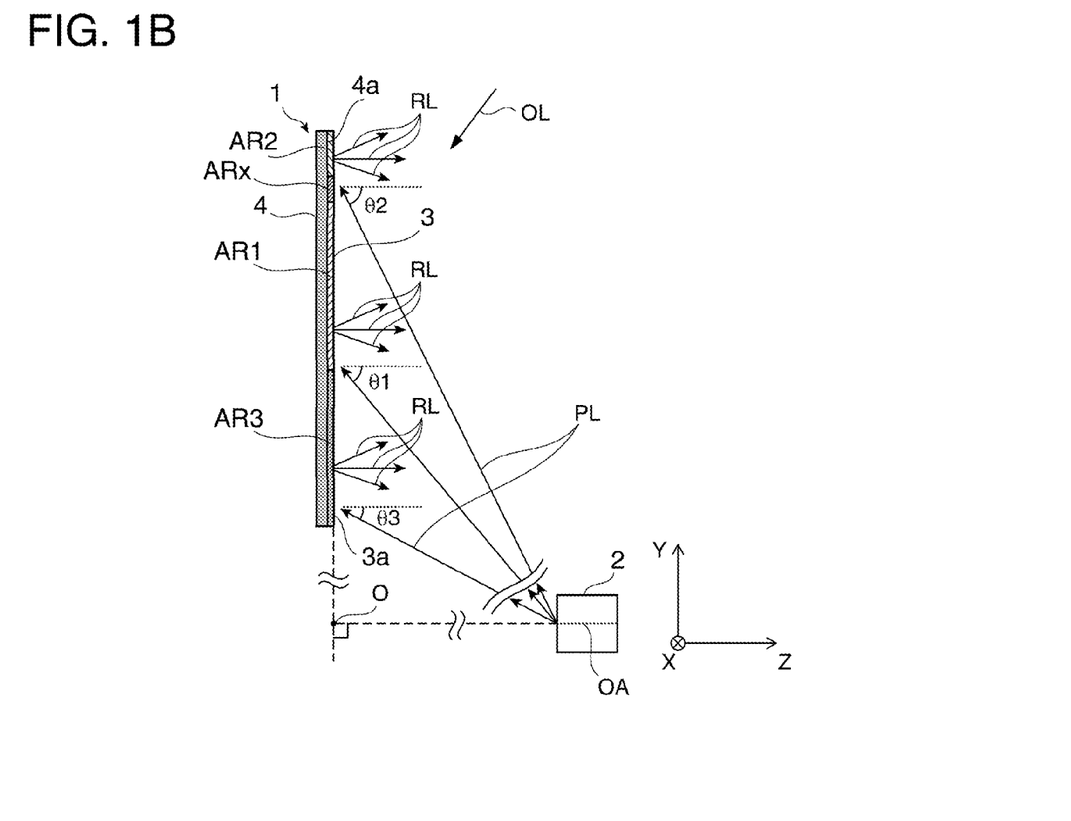
FIG. 1B is a side view of the screen shown in FIG. 1A.

As illustrated in FIGS. 1A and 1B, the screen 1 is a reflection type screen which receives projection light PL from a projector 2 disposed below and in front of the screen 1 and supplies the projection light PL toward the front, i.e., the front surface side of the screen 1 (+Z axis direction) as reflection light RL.

The screen 1 includes a screen substrate 4 as a support body, and a surface portion 3 having a plurality of concaves 20 (see FIGS. 2A, 6A, and other figures to be referred to later).

The screen substrate 4 is a sheet-shaped component made of materials containing light absorbing material. The light absorbing material is black polyvinyl chloride, black PET (polyethylene terephthalate) or the like, which allows the screen substrate 4 to absorb outside light OL and others.

The surface portion 3 is a layered portion having a base material constituted by the same light absorbing material as that of the screen substrate 4. The surface portion 3 is provided throughout a surface 4a of the screen substrate 4 in the form of a skin, and is divided into sections of a first area AR1, a second area AR2, and a third area AR3. The first area AR1, the second area AR2, and the third area AR3 are provided in correspondence with the ranges of angles of incidence $\theta1$, $\theta2$, and $\theta3$ ($\theta3<\theta1<\theta2$) of the projection light PL with respect to the screen substrate 4, and are successively disposed such that the projection position of the projection light PL changes from the third area AR3 to the first area AR1 and further to the second area AR2 as the angle of incidence increases from $\theta3$ to $\theta1$ and further to $\theta2$. Since the first through third areas AR1 through AR3 are provided in correspondence with the angles of incidence $\theta1$, $\theta2$, and $\theta3$, the boundaries between the respective areas AR1, AR2, and AR3 have circular-arc shapes. It is assumed herein that the angles of incidence $\theta1$, $\theta2$, and $\theta3$ are angles formed by the normal line of a plane extending along the screen substrate 4 and the beam of the projection light PL.

Each of the first area AR1, the second area AR2, and the third area AR3 has minute concave and convex structure on a surface (projection surface) 3a considering the angles of incidence $\theta1$, $\theta2$, and $\theta3$ of the projection light PL. That is, the plural concaves 20 provided in the respective areas have different shapes and different arrangements for each of the three areas AR1, AR2, and AR3. For example, the minute concave and convex structure as the arrangement condition of the concaves 20 gradually changes in accordance with the successively changeable angles of incidence $\theta1$ and $\theta2$ in the first and second areas AR1 and AR2 so as to secure view in each part of the screen 1 (secure a condition not containing loss of pixels as viewed from an observer). In addition, since the arrangement condition of the concaves 20 gradually changes in the first area AR1, unevenness in switching between the first area AR1 and the third area AR3 is not produced. A transition area ARx having modified minute concave and convex structure as the arrangement condition of the concaves 20 is provided in the second area AR2 in the vicinity of the boundary between the second area AR2 and the first area AR1 so as to reduce unevenness in switching between the areas AR2 and AR1.

Each of the concaves 20 provided in each of the first area AR1, the second area AR2, and the third area AR3 basically has a spherical surface having substantially the same curvature (see FIGS. 4, 8, 11, and other figures to be referred to later), and is disposed adjacent to one another on substantially circular-arc-shaped curves (more specifically, arrangement lines R1, R3, and R5) whose centers located at a reference point O of the screen 1. The reference point O lies on a vertical line passing the center of the screen substrate 4 and extending in the Y axis direction, and corresponds to a cross point of an extension plane of the projection surface 3a of the screen 1 and an optical axis OA of a projection system of the projector 2.

Figure 2A:
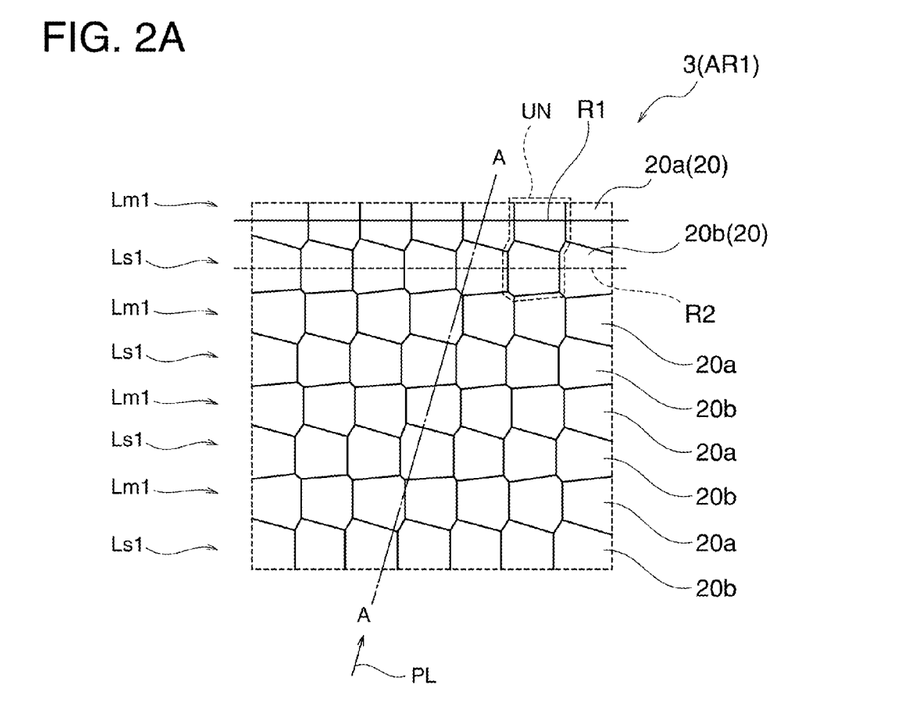
FIG. 2A illustrates an enlarged part of a first area of the screen.
Figure 2B:
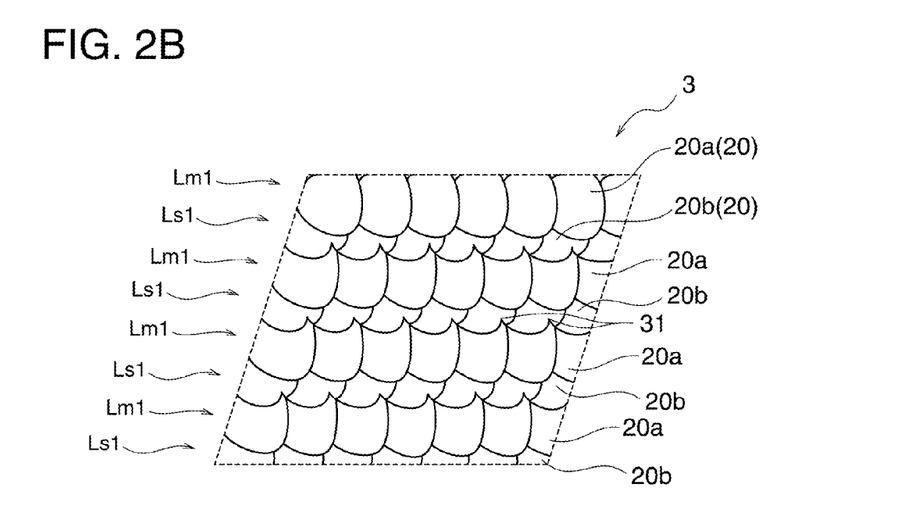
FIG. 2B is a perspective view of the area shown in FIG. 2A.
Figure 3:
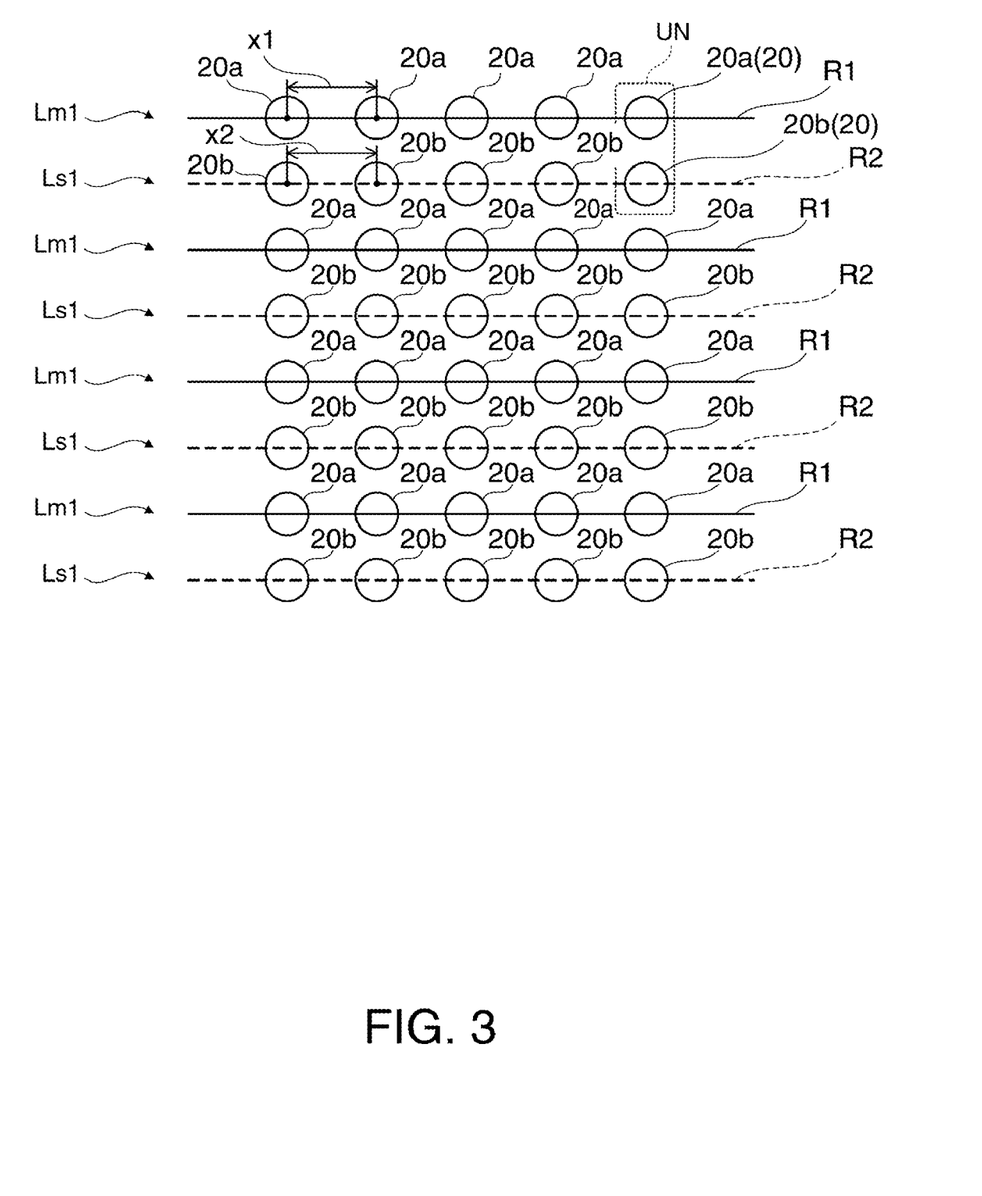
FIG. 3 schematically illustrates an arrangement pattern of concaves in the first area shown in FIGS. 2A and 2B.
Figure 4:
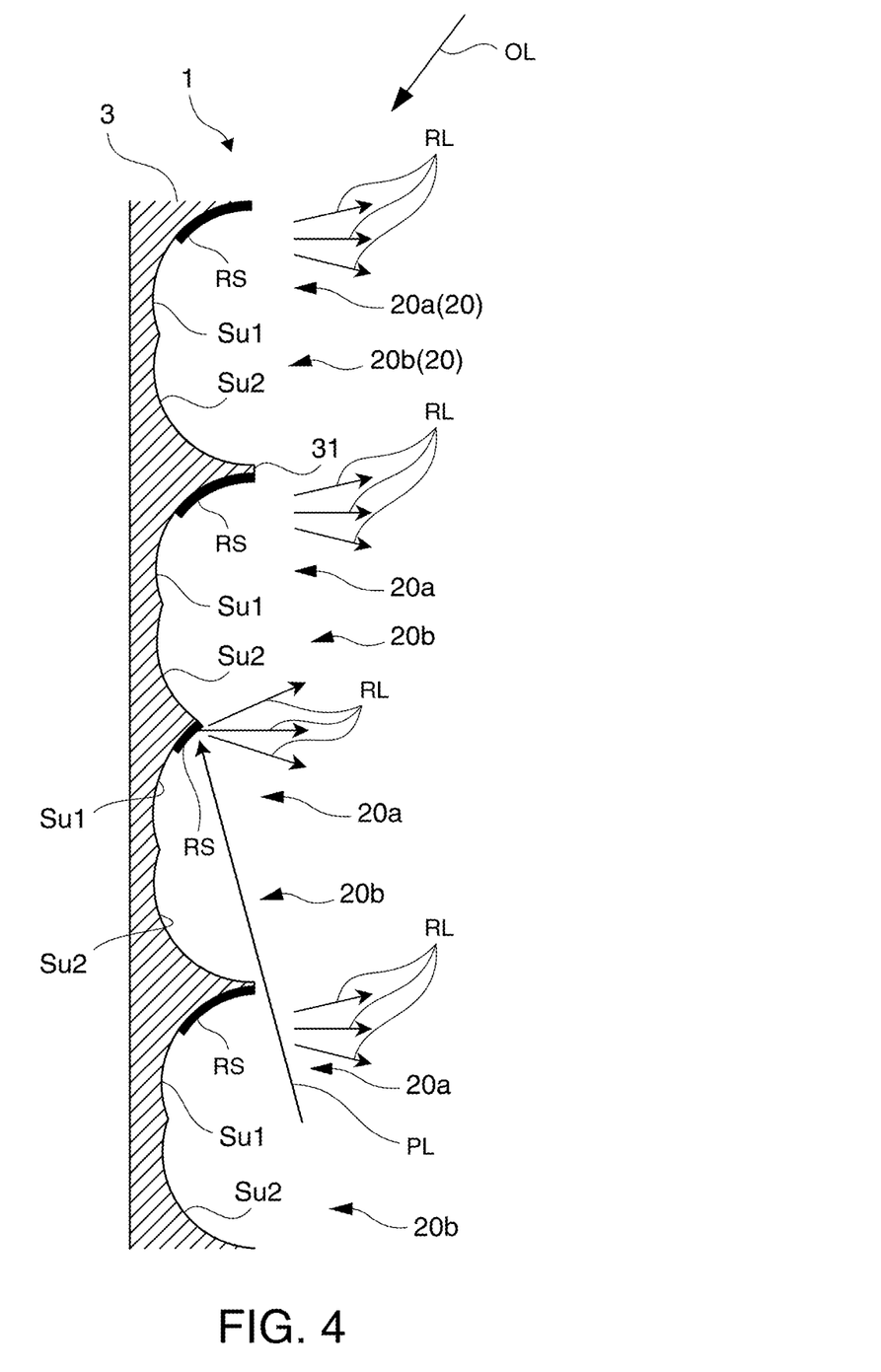
FIG. 4 is a cross-sectional view taken along a line A-A in FIGS. 2A and 2B.

FIGS. 2A and 2B illustrate an enlarged part of the first area AR1 on the surface portion 3. FIG. 3 schematically illustrates an arrangement pattern of the concaves 20 shown in FIGS. 2A and 2B. FIG. 4 is a cross-sectional view taken along a line A-A in FIG. 2A in the direction of the projection light. In FIGS. 2A and 2B, the projection light PL travels in the direction of the line A-A from the projector 2.

FIG. 3 is a schematic illustration for explaining first main lines Lm1 and first supplementary lines Ls1 formed by the concaves 20, and shows a condition in which first and second concaves 20a and 20b are arranged along the linear arrangement lines R1 and R2. However, when viewed macroscopically, the first main lines Lm1 and the first supplementary lines Ls1 have a number of the first and second concaves 20a and 20b along the arrangement lines R1 and R2 extending in circular-arc shapes. In FIG. 3, the first and second concaves 20a and 20b have hemispherical shapes and are disposed with a clearance between one another for easy understanding of the explanation. In fact, however, the first and second concaves 20a and 20b are disposed such that the outer circumferences of the hemispherical shapes have overlaps with one another, the overlaps are removed to locate the concaves adjacent to one another.

As can be seen from FIG. 3, a center distance x1 between each adjoining pair of the first concaves 20a on each of the first main lines Lm1 is substantially uniform. Similarly, a center distance x2 between each adjoining pair of the second concaves 20b on each of the first supplementary lines Ls1 is substantially uniform. In fact, the first and second concaves 20a and 20b are disposed along the arrangement lines R1 and R2 with no clearance left between one another as illustrated in FIG. 2A and other figures.

The first area AR1 has the first main lines Lm1 and the first supplementary lines Ls1 alternately and repeatedly disposed in a direction crossing the line arrangement directions. Each of the first main lines Lm1 is paired with the first supplementary line Ls1 positioned adjacent to the corresponding first main line Lm1 on the surface portion 3 on the entrance side of the projection light PL (i.e., on the projector 2 side and approximately on the −Y axis direction side). As illustrated in FIG. 3 and other figures, the number of the second concaves 20b forming each of the first supplementary lines Ls1 in the first area AR1 is the same as the number of the first concaves 20a forming the first main line Lm1 paired with the corresponding first supplementary line Ls1. The first concave 20a and the second concave 20b adjacent to each other in a direction substantially perpendicular to the arrangement lines R1 and R2 on the paired first main line Lm1 and first supplementary line Ls1 constitute a unit UN containing the first and second concaves 20a and 20b with a ratio of approximately 1:1. For easy understanding of the explanation, the single first concave 20a on one of the first main lines Lm1 and the single second concave 20b disposed adjacent to the corresponding first concave 20a on the entrance side of the projection light PL on the first supplementary line Ls1 disposed adjacent to the corresponding first main line Lm1 are determined as the unit UN which is regarded as a set in view of optical functions. The second concave 20b in the one unit UN has a function of securing an optical path through which the projection light PL enters the corresponding first concave 20a (see FIG. 4).

The clearance between the paired lines Lm1 and Ls1 as the unit UN, and the interval between the first main lines Lm1 and Lm1 with the first supplementary line Ls1 sandwiched therebetween, i.e., the pitch of the first main lines Lm1 are now explained with reference to FIGS. 5A and 5B. The clearance between the paired lines Lm1 and Ls1 and the pitch of the first main lines Lm1, strictly speaking, become larger as the angle of incidence θ1 of the projection light PL with respect to the screen substrate 4 increases.

Figure 5A:
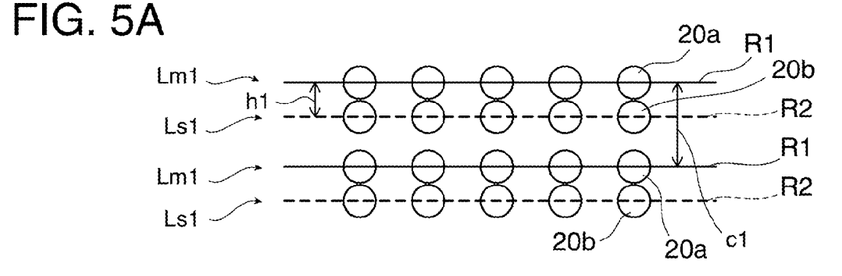
FIGS. 5A through 5D illustrate changes of distances between concaves disposed in a direction perpendicular to arrangement lines.
Figure 5B:
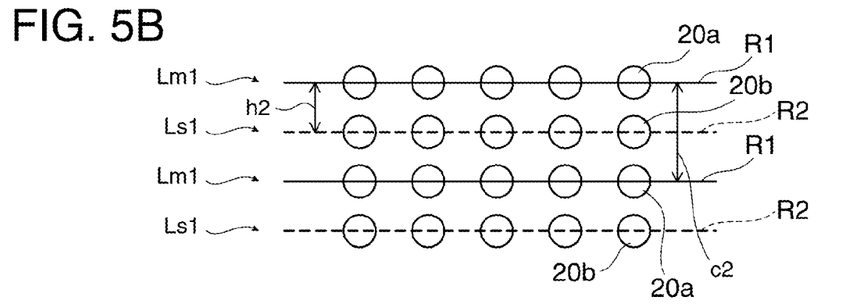

FIG. 5A illustrates the first main line Lm1 and the first supplementary line Ls1 in a region where the angle of incidence θ1 of the projection light PL is relatively small within the first area AR1. FIG. 5B illustrates the first main line Lm1 and the first supplementary line Ls1 in a region where the angle of incidence θ1 of the projection light P1 is relatively large within the first area AR1. A clearance h2 between the paired first main line Lm1 and first supplementary line Ls1 in the region where the angle of incidence θ1 of the projection light PL is relatively large becomes larger than a clearance h1 between the paired first mainline Lm1 and first supplementary line Ls1 in the region where the angle of incidence θ1 of the projection light PL is relatively small. Similarly, an interval (pitch) c2 in the region where the angle of incidence θ1 of the projection light PL is large becomes larger than an interval (pitch) c1 in the region where the angle of incidence θ1 is small.

In the area AR1, the clearance h1 is set at zero in a region close to the boundary between the area AR1 and the third area AR3 (a region where the angle of incidence θ1 is smaller), and the clearance between the paired lines Lm1 and Ls1 and the pitch of the first main lines Lm1 gradually become larger as the position shifts away from the third area AR3. This structure prevents unevenness in switching between the first area AR1 and the third area AR3.

The circular-arc curves along which the first main lines Lm1 and the first supplementary lines Ls1 are disposed (the arrangement lines R1, R3, and R5) are not limited to "circular" shapes but may "elliptic" shapes, "freely curved" shapes, or combinations of these shapes. In addition, the arrangement lines R1, R3, and R5 may be combinations of straight lines and curves constituting the "elliptic" shapes or the "freely curved" shapes.

Reflection films RS formed on the first concaves 20a are now explained with reference to FIG. 4. According to each structure of the first concaves 20a, at least a part of the surface of the first concave 20a reflects the projection light PL toward the front, and the other part absorbs or transmits the outside light. More specifically, as can be seen from FIG. 4, the reflection film RS for reflecting the projection light PL is formed at a position for receiving the projection light PL from the projector 2 on a part of each surface Su1 of the first concaves 20a. On the other hand, the portion of the first concave 20a on which the reflection film RS is not formed absorbs entering light by the properties of the base material of the surface portion 3 and the screen substrate 4. Thus, each of the first concaves 20a reflects the projection light PL supplied from below the screen 1 toward the observer side (toward the front of the screen 1) as the reflection light RL, and does not reflect the outside light OL supplied from above toward the observer side.

As can be seen from FIG. 4, the reflection film RS is not formed on each surface Su2 of the second concaves 20b. Thus, the second concaves 20b can absorb entering light by the properties of the base material of the surface portion 3 and the screen substrate 4.

The second area AR2 is now described. As illustrated in FIG. 1B, the second area AR2 is disposed in the area where the angle of incidence of the projection light PL with respect to the screen 1 becomes larger than in the first area AR1.

Figure 6A:
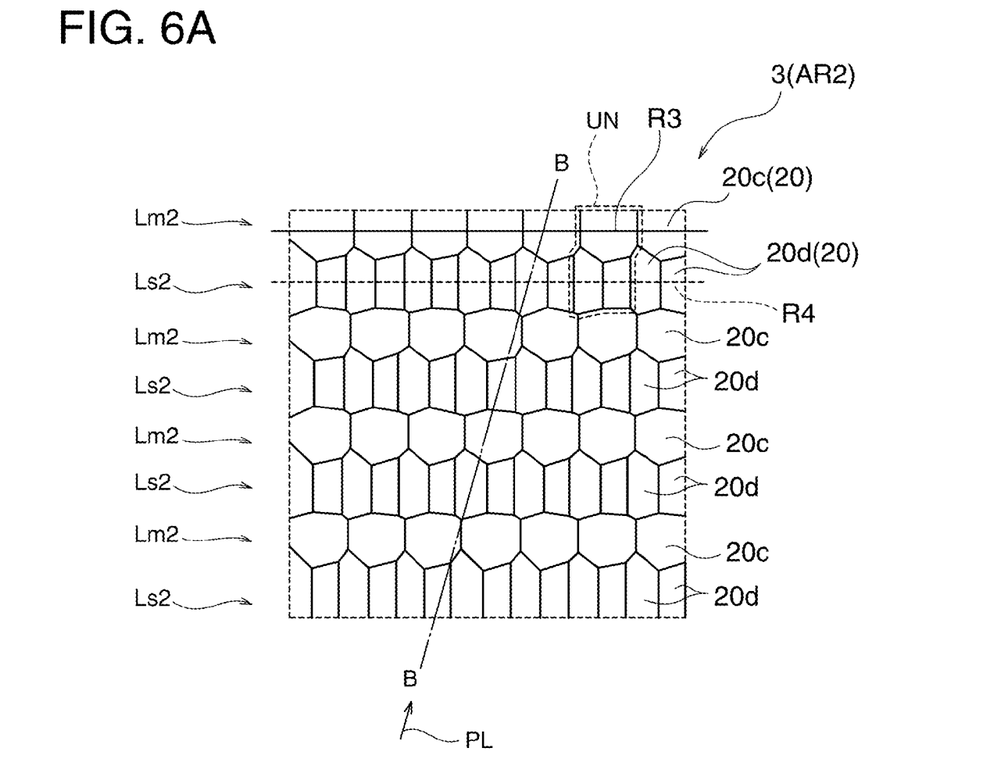
FIG. 6A illustrates an enlarged part of a second area of the screen.
Figure 6B:
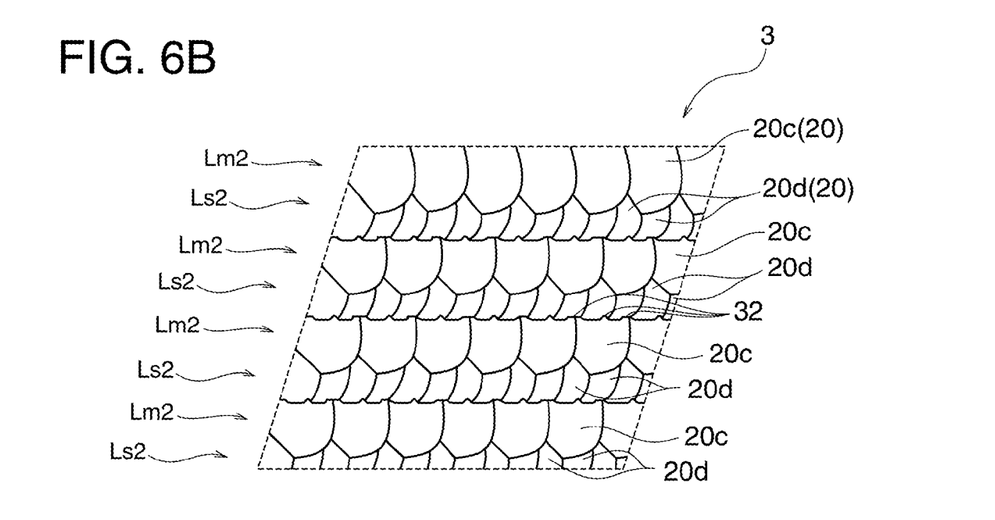
FIG. 6B is a perspective view of the area shown in FIG. 6A.
Figure 7:
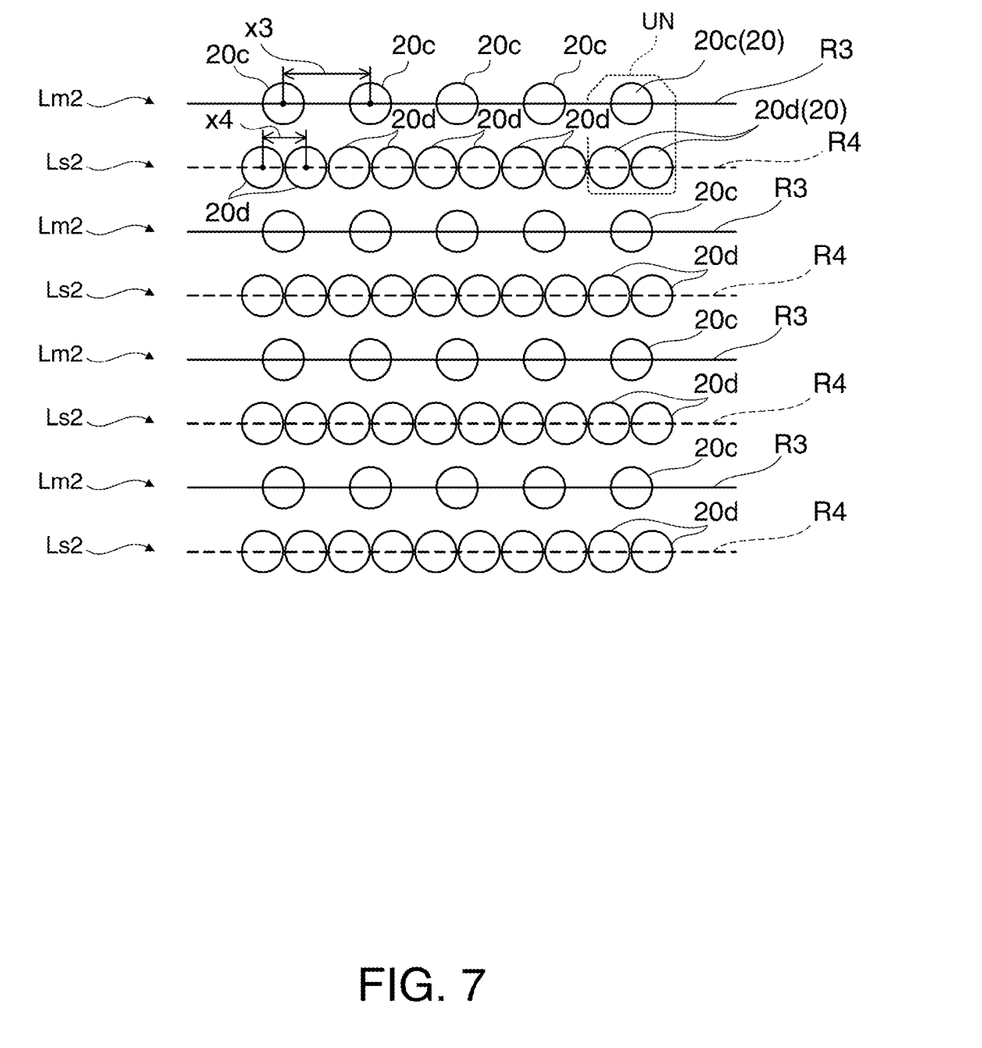
FIG. 7 schematically illustrates an arrangement pattern of concaves in the second area shown in FIGS. 6A and 6B.
Figure 8:
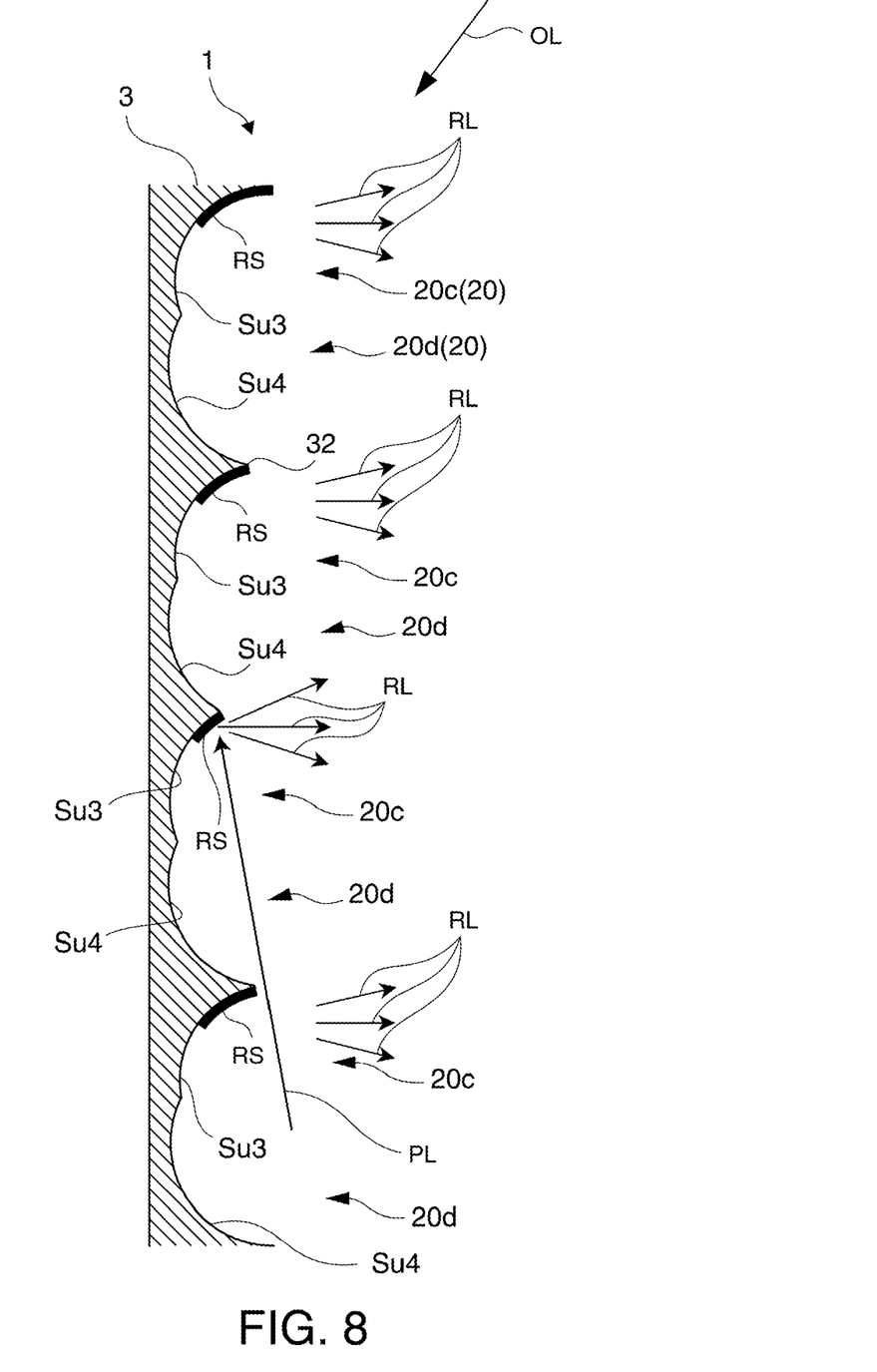
FIG. 8 is a cross-sectional view taken along a line B-B in FIGS. 6A and 6B.

FIGS. 6A and 6B illustrate an enlarged part of the second area AR2 on the surface portion 3. FIG. 7 schematically illustrates an arrangement pattern of the concaves 20 shown in FIGS. 6A and 6B. FIG. 8 is a cross-sectional view taken along a line B-B in the direction of the projection light shown in FIG. 6A. In FIGS. 6A and 6B, the projection light PL travels in the direction of the line B-B from the projector 2.

FIG. 7 is a schematic and enlarged illustration for explaining second main lines Lm2 and second supplementary lines Ls2 formed by the concaves 20, and shows a condition in which third and fourth concaves 20c and 20d are arranged along the linear arrangement lines R3 and R4. However, when viewed macroscopically, the second main lines Lm2 and the second supplementary lines Ls2 have a number of the third and fourth concaves 20c and 20d along the arrangement lines R3 and R4 extending in circular-arc shapes. In FIG. 7, the third and fourth concaves 20c and 20d have hemispherical shapes and are disposed with a clearance between one another for easy understanding of the explanation. In fact, however, the third and fourth concaves 20c and 20d are disposed such that the outer circumferences of the hemispherical shapes have overlaps with one another, the overlaps are removed to locate the concaves adjacent to one another.

As can be seen from FIG. 7, a center distance x3 between each adjoining pair of the third concaves 20c on each of the second main lines Lm2 is substantially uniform.

Similarly, a center distance x4 between each adjoining pair of the fourth concaves 20d on each of the second supplementary lines Ls2 is substantially uniform. In fact, the third and fourth concaves 20c and 20d are disposed along the arrangement lines R3 and R4 with no clearance left between one another as illustrated in FIG. 6A and other figures.

The second area AR2 has the second main lines Lm2 and the second supplementary lines Ls2 alternately and repeatedly disposed in a direction crossing the line arrangement directions. Each of the second main lines Lm2 is paired with the second supplementary line Ls2 positioned adjacent to the corresponding second main line Lm2 on the surface portion 3 on the entrance side of the projection light PL (i.e., on the projector 2 side and approximately on the −Y axis direction side). As illustrated in FIG. 7, the number of the fourth concaves 20d forming each of the second supplementary lines Ls2 in the second area AR is larger than the number of the third concaves 20c forming the second main line Lm2 paired with the corresponding second supplementary line Ls2. In this embodiment, the third concave 20c and the fourth concave 20d adjacent to each other in a direction substantially perpendicular to the arrangement lines R3 and R4 on the paired second main line Lm2 and second supplementary line Ls2 constitute the unit UN containing the third and fourth concaves 20c and 20d with a ratio of approximately 1:2. For easy understanding of the explanation, the single third concave 20c on one of the second main lines Lm2 and a pair of the fourth concaves 20d disposed adjacent to the corresponding third concave 20c on the entrance side of the projection light PL on the second supplementary line Ls2 disposed adjacent to the corresponding second main line Lm2 are determined as the unit UN which is regarded as a set in view of optical functions (see FIG. 6A and other figures). The pair of the fourth concaves 20d in the one unit UN have a function of securing an optical path through which the projection light PL enters the corresponding single third concave 20c (see FIG. 8).

The clearance between the paired lines Lm2 and Ls2, and the interval of the second main lines Lm2 and Lm2 with the second supplementary line Ls2 sandwiched therebetween, i.e., the pitch of the second main lines Lm2 are now explained with reference to FIGS. 5C and 5D. The clearance between the paired lines Lm2 and Ls2 and the pitch of the second main lines Lm2, strictly speaking, become larger as the angle of incidence θ2 of the projection light PL with respect to the screen substrate 4 increases.

Figure 5C:
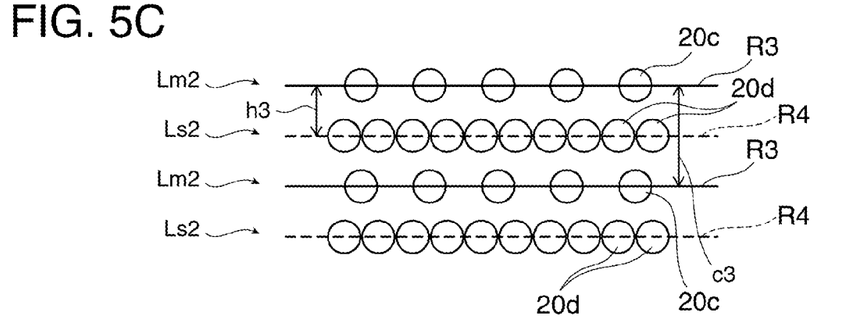
Figure 5D:
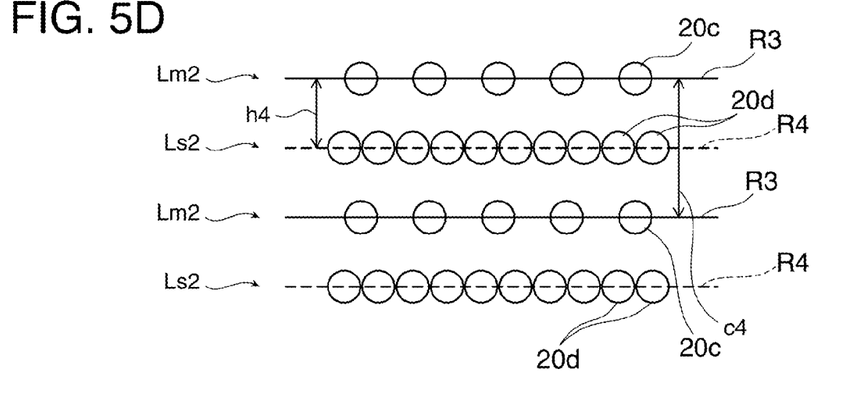

FIG. 5C illustrates the second main line Lm2 and the second supplementary line Ls2 in a region where the angle of incidence θ2 of the projection light PL is relatively small within the second area AR2. FIG. 5D illustrates the second main line Lm2 and the second supplementary line Ls2 in a region where the angle of incidence θ2 of the projection light PL is relatively large within the second area AR2. A clearance h4 between the paired second main line Lm2 and second supplementary line Ls2 in the region where the angle of incidence θ2 of the projection light PL is relatively large becomes larger than a clearance h3 between the paired second main line Lm2 and second supplementary line Ls2 in the region where the angle of incidence θ2 of the projection light PL is relatively small. Similarly, as for the pitch of the second main lines Lm2, an interval (pitch) c4 in the region where the angle of incidence θ2 of the projection light PL is relatively large becomes larger than an interval (pitch) c3 in the region where the angle of incidence θ2 of the projection light PL is relatively small.

The reflection films RS formed on the third concaves 20c are now explained with reference to FIG. 8. According to each structure of the third concaves 20c, at least a part of the surface of the third concave 20c reflects the projection light PL toward the front, and the other part absorbs or transmits the outside light. More specifically, as can be seen from FIG. 8, the reflection film RS reflecting the projection light PL is formed at a position for receiving the projection light PL from the projector 2 on each surface Su3 of the third concaves 20c. On the other hand, the portion of the third concave 20c on which the reflection film RS is not formed absorbs entering light by the properties of the base material of the surface portion 3 and the screen substrate 4. That is, each of the third concaves 20c reflects the projection light PL supplied from below the screen 1 toward the observer side as the reflection light RL, and does not reflect the outside light OL supplied from above toward the observer side.

As can be seen from FIG. 8, the reflection film RS is not formed on each surface Su4 of the fourth concaves 20d. Thus, the fourth concaves 20d can absorb entering light by the properties of the base material of the surface portion 3 and the screen substrate 4.

Figure 9:
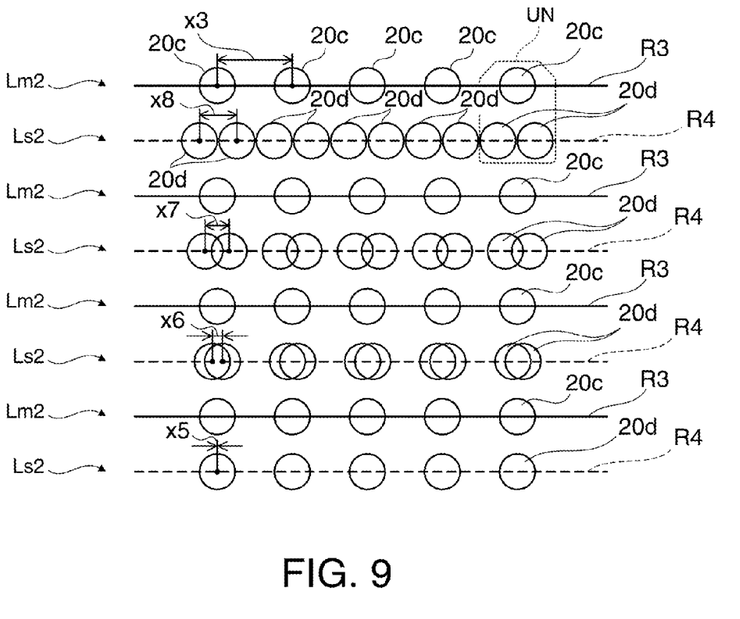
FIG. 9 schematically illustrates an arrangement pattern of concaves in a transition area.

FIG. 9 schematically illustrates an arrangement pattern of the concaves 20 in the transition area ARx provided in the second area AR2 in the vicinity of the boundary between the second area AR2 and the first area AR1. In the transition area ARx, the numbers of the third concaves 20c and the fourth concaves 20d constituting the one unit UN has a ratio of approximately 1:2, but the central distance between a pair of the fourth concaves 20d corresponding to the single third concave 20c is different. More specifically, as illustrated in FIG. 9, the central distance between the adjoining fourth concaves 20d within the one unit UN increases toward a relatively upper region (+Y axis direction), i.e., as the angle of incidence θ2 of the projection light PL with respect to the screen substrate 4 becomes larger. In this case, central distances x5, x6, x7 and x8 between the respective adjoining pairs of the fourth concaves 20d shown in FIG. 9 satisfy a relation x5<x6<x7<x8. For example, in case of the second supplementary line Ls2 closest to the first area AR1, the central distance x5 between the adjoining fourth concaves 20d provided thereon within the same unit UN is substantially zero, producing an almost overlapping condition of the pair of the fourth concaves 20d in appearance. In case of the second supplementary line Ls2 farthest from the first area AR1, however, the central distance x8 of the adjoining fourth concaves 20d provided thereon within the same unit UN is approximately half of the central distance x3 of the third concaves 20c in the adjoining two units UN.

Figure 10:
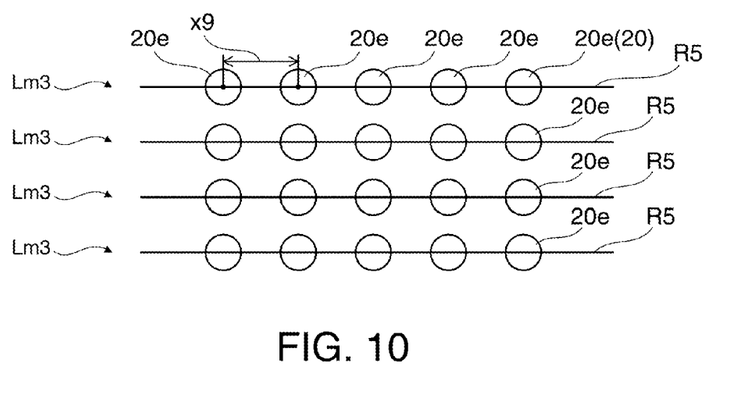
FIG. 10 schematically illustrates an arrangement pattern of concaves in a third area.
Figure 11:
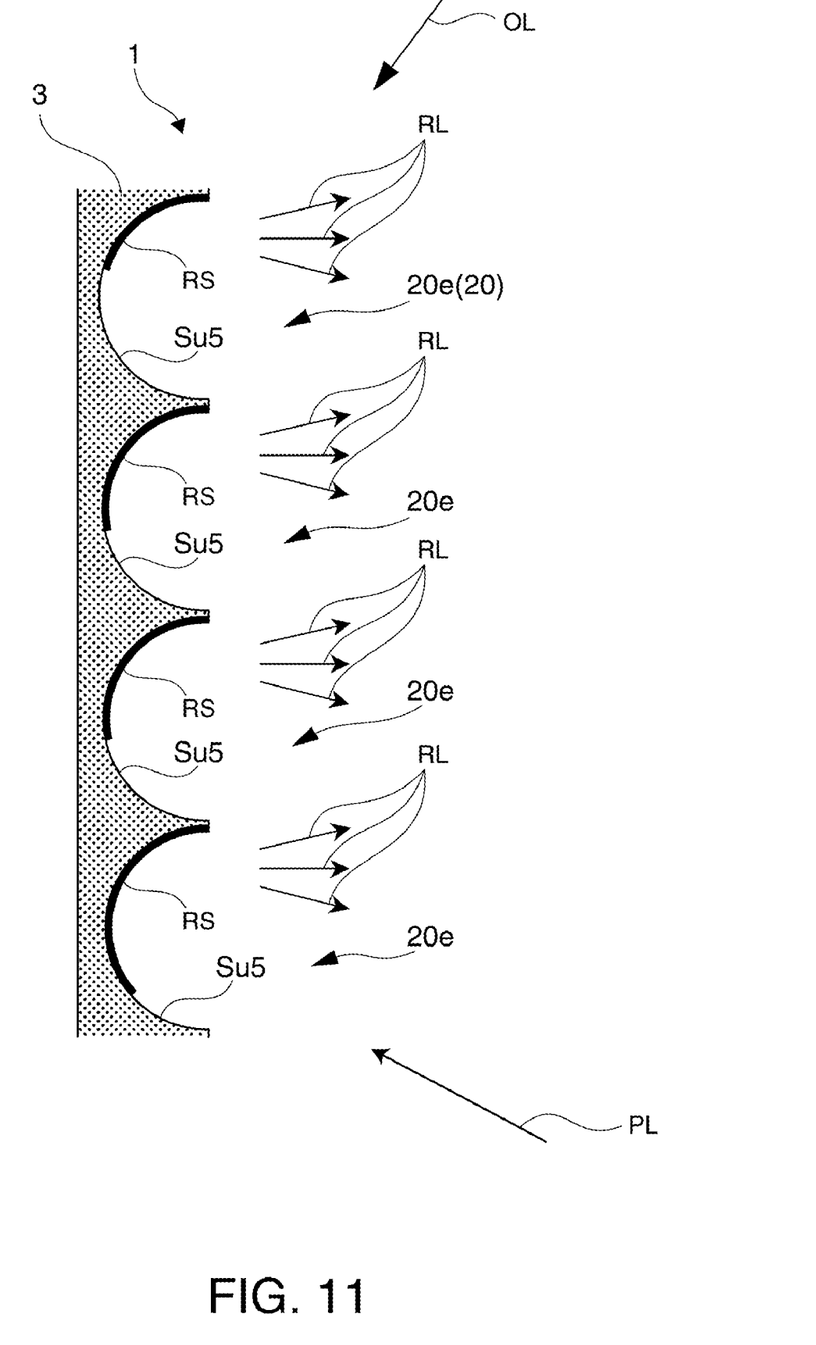
FIG. 11 is a cross-sectional view of the third area shown in FIG. 10 in the direction of projection light.

FIG. 10 schematically illustrates an arrangement pattern of the concaves 20 in the third area AR3. FIG. 11 is a cross-sectional view of the third area AR3 in the direction of the projection light. The third area AR3 has third main lines Lm3. Each of the third main lines Lm3 has a number of fifth concaves 20e along the arrangement lines R5 extending in circular-arc shapes in macroscopic view. A central distance x9 between each adjoining pair of the fifth concaves 20e is substantially uniform. In fact, the fifth concaves 20e are disposed such that the outer circumferences of the hemispherical shapes have overlaps with one another, the overlaps are removed to locate the concaves adjacent to one another with no clearance left therebetween. As illustrated in FIG. 11, the reflection film RS reflecting the projection light PL is formed on each surface Su5 of the fifth concaves 20e in a position for receiving the projection light PL from the projector 2. On the other hand, the portion of the fifth concave 20e on which the reflection film RS is not formed absorbs entering light by the properties of the base material of the surface portion 3 and the screen substrate 4. That is, the fifth concave 20e reflects the projection light PL supplied from below the screen 1 toward the observer side as the reflection light RL, and does not reflect the outside light OL supplied from above toward the observer side.

According to this structure, the first main lines Lm1 in the first area AR1 and the second main lines Lm2 in the second area AR2 are disposed such that the relation of the clearances h1<h2<h3<4 holds as illustrated in FIGS. 5A through 5D. Thus, the density of the first main lines Lm1 in the first area AR1 is higher than the density of the second main lines Lm2 in the second area AR2.

As can be seen from FIGS. 3, 7, and 10, the distances x1, x3, and x9 between the concaves 20a, 20c, and 20e on the first main line Lm1 in the first area AR1, the second main line Lm2 in the second area AR2, and the third main line Lm3 in the third area AR3 are substantially uniform. In fact, however, the distances x1, x3, and x9 of the concaves 20a, 20c, and 20e are individually controlled such that an appropriate display condition of the entire screen 1 can be produced.

A manufacturing method of the screen 1 is now explained. Initially, in the screen 1, manufacture of a base sheet forming the screen substrate 4 and the surface portion 3 is discussed. The base sheet is made of a material chiefly containing black polyvinyl chloride capable of absorbing light, for example. More specifically, the surface of a sheet made of polyvinyl chloride is heated and softened, and then concaves and convexes are formed by press working using a mold having concave and convex shapes corresponding to the shape of a number of the concaves 20, for example. As a result, a number of minute concave and convex shapes corresponding to the concaves 20 (20a, 20b, 20c, 20d, and 20e) are formed on the base sheet of the screen 1. The sheet made of polyvinyl chloride may contain glass fibers or the like to increase the strength.

Next, a manufacture step of the reflection films RS formed on the first, third, and fifth concaves 20a, 20c, and 20e on the base sheet of the screen 1 is explained. In this step, a film forming device which forms films by vacuum deposition is used for forming the reflection films RS, for example. The material used for forming the films is aluminum or the like. The base sheet of the screen 1 is fixed at a predetermined height along the inner wall surface of a cylindrical vacuum container included in the film forming device. The film forming device heats and evaporates the material of the films in the vacuum container, and deposits the reflection films RS on the first, third, and fifth concaves 20a, 20c, and 20e. The film forming device has an evaporation source in the vacuum container in the same direction as the supply direction of the projection light PL to the screen 1. By this arrangement, the reflection films RS can be obliquely deposited in a direction inclined to the base sheet in correspondence with the projection light PL, and thus can be formed at appropriate positions on the first, third, and fifth concaves 20a, 20c, and 20e.

The base sheet forming the screen substrate 4 and the surface portion 3 may be a sheet-shaped base material chiefly containing transparent PET (polyethylene terephthalate) or the like having light transmissibility with light absorbing black ink applied to the back surface of the base material.

According to this method, the concaves 20 overlap with one another, and thus a projection is produced between each adjoining pair of the concaves 20. More specifically, in the first area AR1, a projection 31 is formed at the corner between the first concaves 20a and the second concaves 20b in each adjoining pair of the units UN as illustrated in FIGS. 2B and 4. In the second area AR2, projections 32 are formed at the corner between the third concaves 20c and the fourth concaves 20d and the intermediate positions in each adjoining pair of the units UN as illustrated in FIGS. 6B and 8. As described above, the number of the fourth concaves 20d on the second supplementary line Ls2 in the one unit UN in the second area AR2 is larger than the number of the second concaves 20b on the first supplementary line Ls1 in the one unit UN in the first area AR1. Thus, when the pitch of the arrangement lines R1 of the first main lines Lm1 is equal to the pitch of the arrangement lines R3 of the second main lines Lm2, each height of the projections 32 formed between the adjoining pairs of the units UN in the Y axis direction in the second area AR2 is relatively smaller than each height of the projections 31 formed between the adjoining pairs of the units UN in the Y axis direction in the first area AR1.

Figure 12A:
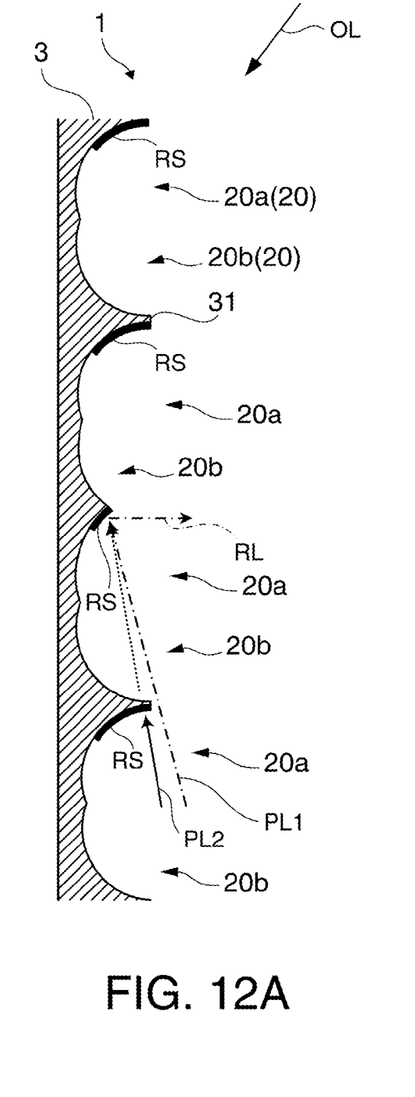
FIGS. 12A and 12B are cross-sectional views showing the relationship between the concaves and the projection light.
Figure 12B:
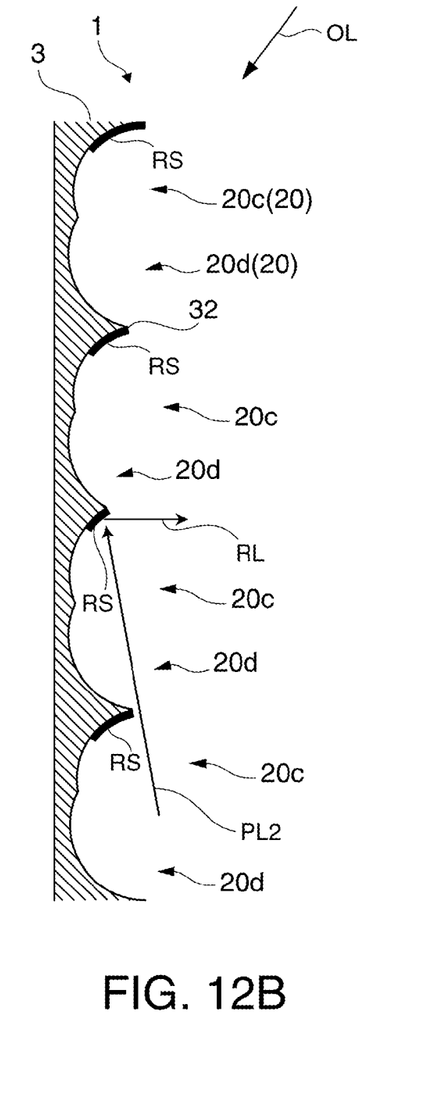

The relationship between the concaves 20 and the projection light PL is now described. FIG. 12A shows the relationship between the cross-sectional view of the concaves 20 in the first area AR1 taken along the line A-A in FIG. 2A and projection lights PL1 and PL2. FIG. 12B shows the relationship between the cross-sectional view of the concaves 20 in the second area AR2 taken along the line B-B in FIG. 6A and the projection light PL2. The projections 31 and 32 particularly relating with the projection light PL in each of the first area AR1 and the second area AR2 are herein explained, though the heights of the projections at the boundaries between the concaves are not actually uniform even within the same area depending on the arrangement of the concaves 20. As illustrated in FIG. 12A, the projection light PL1 reaches the reflection film RS on the first concave 20a without being blocked by the high projection 31 positioned on the first concave 20a on the entrance side of the projection light PL1 in the first area AR1 of the screen 1 shown in FIGS. 1A and 1B. However, when a minute concave and convex structure similar to that of the first area AR1 is provided in the second area AR2 of the screen 1 shown in FIGS. 1A and 1B, the projection light PL2 is blocked by the high projection 31 as illustrated in FIG. 12A. In this case, the projection light PL2 does not reach the reflection film RS on the first concave 20a. On the other hand, as illustrated in FIG. 12B, the projection light PL2 reaches the reflection film RS on the third concave 20c without being blocked by the low projection 32 positioned on the third concave 20c on the entrance side of the projection light PL2 in the second area AR2 of the screen 1 shown in FIGS. 1A and 1B.

According to the screen 1 in this embodiment, the first and second supplementary lines Ls1 and Ls2 are provided as well as the first and second main lines Lm1 and Lm2. Thus, even when the angle of incidence of the projection light PL with respect to the screen 1 is large, a sufficient amount of the projection light PL can be supplied to the reflection films RS formed on the first and third concaves 20a and 20c. Moreover, since the number of the fourth concaves 20d on each of the second supplementary lines Ls2 is larger than the number of the third concaves 20c on each of the second main lines Lm2, each height of the projections 32 in the second area AR2 becomes smaller than each height of the projections 31 in the first area AR1. Thus, even when the angle of incidence of the projection light PL with respect to the screen 1 is larger in the second area AR2 than in the first area AR1, the projection light PL is prevented from being blocked by the projections 32. Accordingly, loss of view can be reduced.

According to this embodiment, the distance between the adjoining pair of the fourth concaves 20d adjacent to the third concaves 20c within the one unit UN in the transition area ARx gradually increases as the position of the unit UN shifts away from the first area AR1. Thus, the arrangement of the concaves 20 in the first area AR1 can gradually change to the different arrangement of the concaves 20 in the second area AR2. Accordingly, unevenness in switching caused by the change from the first area AR1 to the second area AR2 is not produced in the display of the image reflected by the portion of the boundary between the first area AR1 and the second area AR2.

Second Embodiment

Figure 13:
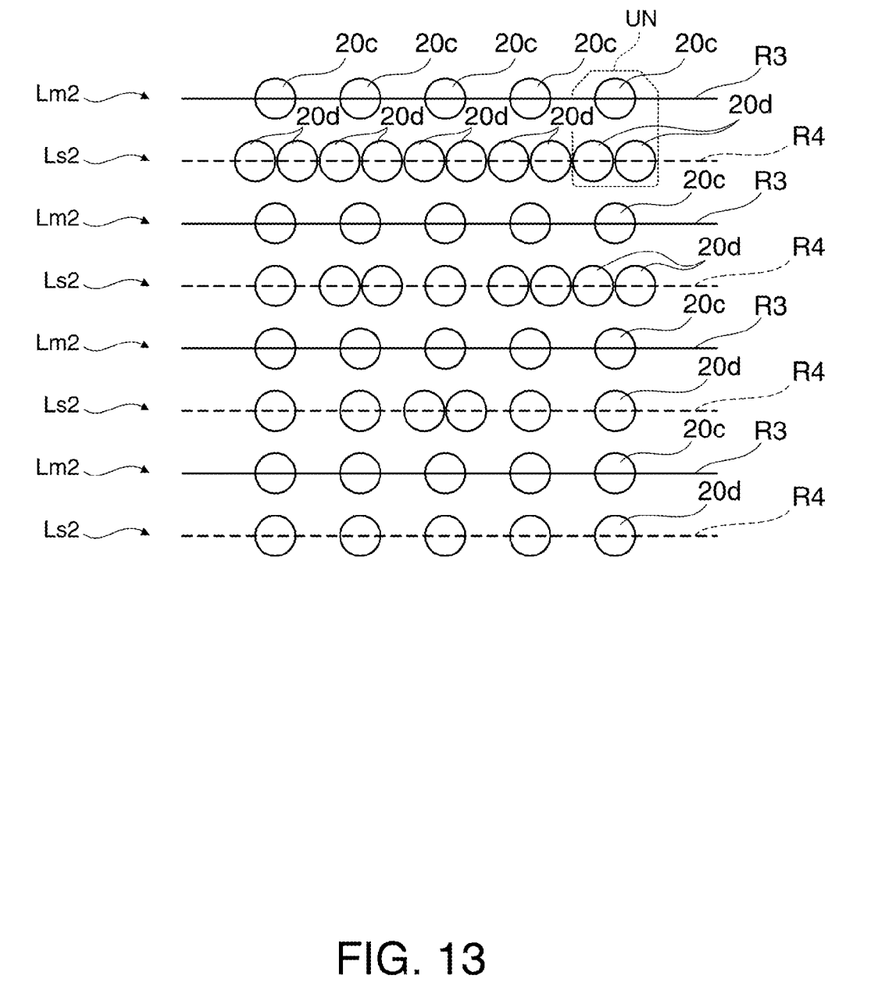
FIG. 13 schematically illustrates an arrangement pattern of concaves in a transition area of the screen in a second embodiment.

FIG. 13 illustrates the screen 1 according to a second embodiment. The screen 1 in this embodiment has structure similar to that of the screen 1 in the first embodiment except for the arrangement pattern of the transition area ARx. Thus, the same explanation is not repeated herein.

In the transition area ARx, the number of the fourth concaves 20d corresponding to the third concave 20c within the one unit UN is not uniform. As illustrated in FIG. 13, the number of the adjoining fourth concaves 20d gradually increases as the angle of incidence of the projection light PL with respect to the screen substrate 4 becomes larger. More specifically, the increase in the number of the adjoining fourth concaves 20d on the second supplementary line Ls2 closest to the first area AR1 (the lowermost line in FIG. 13) is zero, and thus the third concave 20c and the fourth concave 20d are provided with a ratio of 1:1 in appearance. The number of the fourth concaves 20d constituting the second supplementary line Ls2 gradually increases as the position of the second supplementary line Ls2 shifts away from the first area AR1. Thus, the number of the adjoining fourth concaves 20d on the second supplementary line Ls2 (the uppermost line in FIG. 13) is twice larger than the number of the third concaves 20c forming the second main line Lm2. In this case, the positions of the increased fourth concaves 20d in the arrangement direction are randomly determined.

According to the screen 1 in this embodiment, the number of the fourth concaves 20d on each of the second supplementary lines Ls2 in the transition area ARx gradually increases as the positions of the fourth concaves 20d shift away from the first area AR1. Thus, unevenness in switching caused by the change from the first area AR1 to the second area AR2 in the boundary between the first area AR1 and the second area AR2 can be reduced.

It is not intended that the invention is limited to the respective embodiments described and depicted herein. For example, the arrangements and ranges of the first area AR1, the second area AR2, and the third area AR3 are not limited to those shown in FIGS. 1A and 1B but may be any arrangements and ranges as long as the projection light PL received from the projector 2 can be efficiently reflected. For example, the projection light PL is not required to be supplied in the direction perpendicular to the respective lines Lm1, Lm2, Ls 1, and Ls2.

While a pair of the fourth concaves 20d correspond to the single third concave 20c in the second area AR2 in the embodiments, the number of the fourth concaves 20d may be three or larger, or numerals other than integers such as 2.5 and 3.5. In case of the structure including four or a larger number of the fourth concaves 20d corresponding to the single third concave 20c, only the same advantages as those described above can be offered by the second supplementary lines Ls2, and the arrangement of the fourth concaves 20d and the like in the transition area ARx is difficult to be controlled.

While the reflection films RS are made of aluminum as the film forming material, the reflection films RS may be formed by silver or dielectric multilayer films other than aluminum, for example. When the reflection films RS are metal films, protection films can be further provided on the metal films.

According to the embodiments, the surface of the surface portion 3 may be activated before the reflection films RS are formed on the first, third, and fifth concaves 20a, 20c, and 20e. The surface of the surface portion 3 can be activated by reverse sputtering, plasma discharge, corona discharge, RF bombardment, atmospheric plasma, or other processing. When the surface of the surface portion 3 is activated by an appropriate manner, the adhesiveness and durability of the reflection films RS can be improved.

The third area AR3 provided in the embodiments may be eliminated as long as the first and second areas AR1 and AR2 are disposed in such positions and ranges as to efficiently reflect the projection light PL received from the projector 2 in view of the whole screen 1.

The entire disclosure of Japanese Patent Application No:2009-218619, filed Sep. 24, 2009 is expressly incorporated by reference herein.

What is claimed is:
1. A screen comprising:
a screen substrate;
a first area disposed on the screen substrate and containing a first main line which has a plurality of first concaves for reflecting light and a first supplementary line which is disposed on the screen substrate at a position adjacent to the first main line and has the same number of second concaves as that of the first concaves formed adjacent to the second concaves, the first main line and the first supplementary line being alternately and repeatedly arranged; and
a second area disposed on the screen substrate in a region where an angle of incidence of projection light with respect to the screen substrate becomes larger than in the first area and containing a second main line which has a plurality of third concaves for reflecting light and a second supplementary line which is disposed on the screen substrate at a position adjacent to the second main line and has a larger number of fourth concaves as that of the third concaves formed adjacent to the fourth concaves, the second main line and the second supplementary line being alternately and repeatedly arranged.

2. The screen according to claim 1, wherein:
   a reflection portion is formed at least on a part of each surface of the first concaves and the third concaves to reflect the projection light by the reflection portion to the front surface side; and
   the portion other than the part having the reflection portion on each surface of the first concaves and the third concaves and each surface of the second concaves and the fourth concaves absorb or transmit the projection light.

3. The screen according to claim 1, wherein at least a part of each of the first main line, the first supplementary line, the second main line, and the second supplementary line has a circular-arc shape.

4. The screen according to claim 1, wherein the distance between at least a pair of the fourth concaves contained in the second supplementary line and disposed adjacent to the single third concave contained in the second main line in the second area close to the boundary between the second area and the first area increases as the angle of incidence of the projection light with respect to the screen substrate becomes larger.

5. The screen according to claim 1, wherein the number of the fourth concaves contained in the second supplementary line in the second area close to the boundary between the second area and the first area increases as the angle of incidence of the projection light with respect to the screen substrate becomes larger.

6. The screen according to claim 1, wherein the clearance between the first main line and the first supplementary line and the clearance between the second main line and the second supplementary line increase as the angle of incidence of the projection light with respect to the screen substrate becomes larger.

7. The screen according to claim 1, further comprising a third area disposed on the screen substrate in a region where the angle of incidence of the projection light with respect to the screen substrate becomes smaller than in the first area and containing a third main line which has a plurality of fifth concaves and reflects light by at least a part of each of the fifth concaves.

8. The screen according to claim 7, wherein the first concaves, second concaves, third concaves, fourth concaves and the fifth concaves have a spherical surface having substantially the same curvature.

* * * * *